United States Patent Office 2,760,540
Patented Aug. 28, 1956

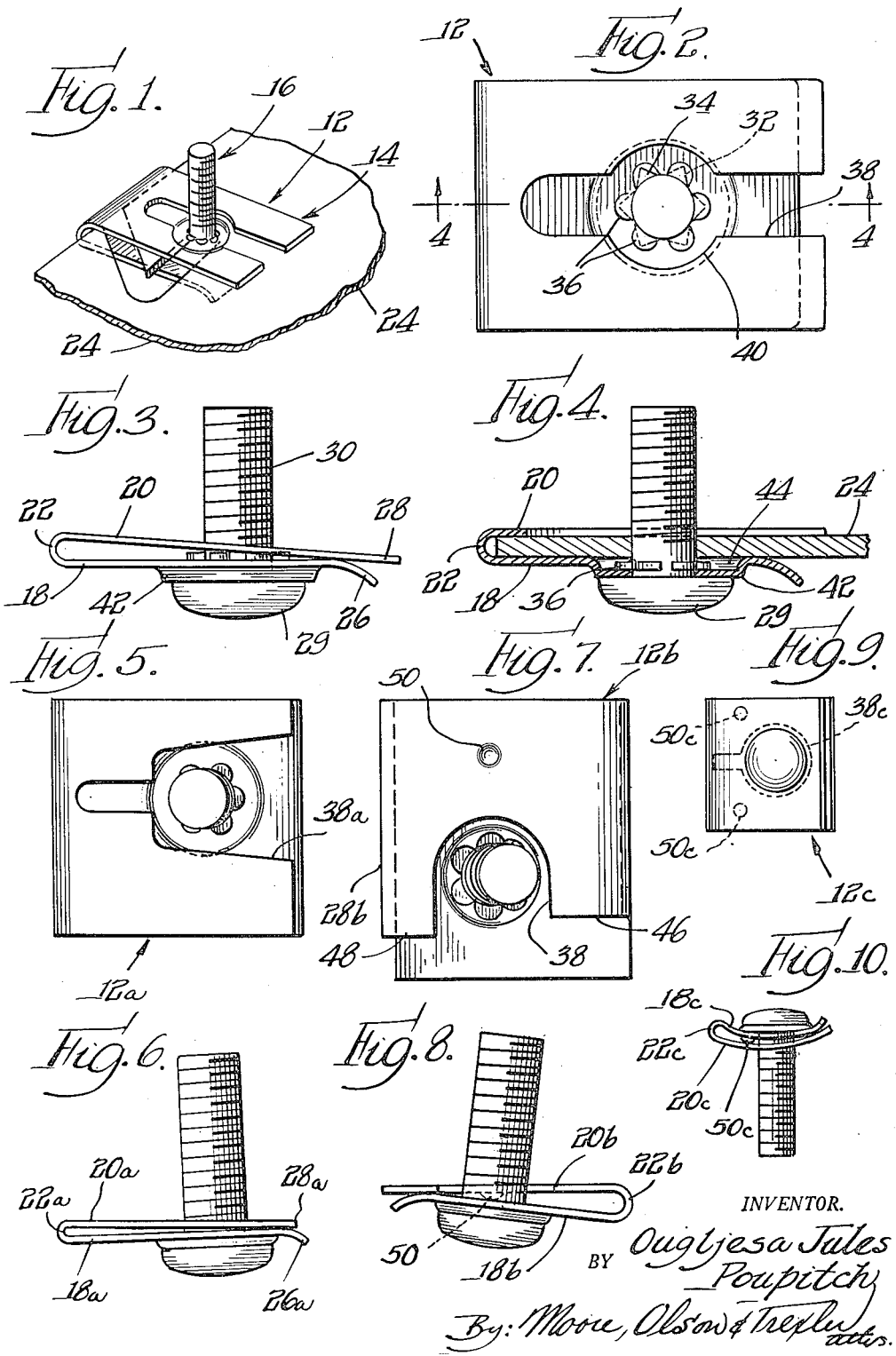

2,760,540
HEADED SCREW FASTENER AND RESILIENT SHEET METAL RETAINER THEREFOR

Ougljesa Jules Poupitch, Itasca, Ill., assignor to Illinois Tool Works, Chicago, Ill., a corporation of Illinois Application January 14, 1953, Serial No. 331,187

2 Claims. (Cl. 151—41.75)

The present invention relates to a novel fastening device and more particularly a novel fastening device of the type comprising a pre-assembled clip member adapted to be attached to a work piece and a fastener member such as a headed screw.

An object of the present invention is to provide a novel pre-assembled fastener unit or device of the above described type which may be manufactured easily and economically.

Another object of the present invention is to provide a novel fastener unit of the above described type wherein the clip member is formed for easy assembly with a work piece and to grip securely the work piece to position the fastener member for application of complementary fastening means.

A more specific object of the present invention is to provide a fastener unit of the above described type wherein the clip member and the fastener member, such as a headed screw, are connected in a simple and novel manner to prevent both relative axial and rotary movement between said clip member and said fastener member.

Other objects and advantages of the present invention will become apparent from the following description and the accompanying drawings wherein:

Fig. 1 is a perspective view showing a novel fastener unit embodying the principles of this invention assembled with a work piece;

Fig. 2 is a plan view of the fastener unit shown in Fig. 1;

Fig. 3 is a side elevational view of the fastener unit shown in Figs. 1 and 2;

Fig. 4 is a vertical cross section taken along line 4—4 in Fig. 2;

Fig. 5 is a plan view showing a fastener unit embodying a modified form of the present invention;

Fig. 6 is a side elevational view of the fastener unit shown in Fig. 5;

Fig. 7 is a plan view showing another modified form of the present invention;

Fig. 8 is a side elevational view of the fastener unit shown in Fig. 7;

Fig. 9 is a plan view of still another modified form of the present invention; and Fig. 10 is a side elevational view of the fastener unit shown in Fig. 9.

Referring now more specifically to the drawings wherein like parts are designated by the same numerals throughout the various figures, a fastener unit 12 embodying one form of the present invention is shown in Figs. 1 through 4. The fastener unit 12 includes a clip member 14 and a screw 16.

The clip member 14 is preferably formed from resilient sheet metal and includes a leg member 18 and an opposed leg member 20. As shown best in Figs. 3 and 4, the leg members are integrally joined together along adjacent axially spaced margins by a bight portion 22 to provide a clip having a generally U-shaped cross section. As shown in Fig. 3, the legs 18 and 20 normally converge from the bight portion toward their opposite free margins. Thus, when the clip is applied to a work piece 24, as shown in Figs. 1 and 4, the legs 18 and 20 resiliently but firmly grip the work piece to hold the fastener unit in the desired position. It should be noted that the legs are substantially co-extensive but that the free margin of the leg 18 terminates in an outwardly curved or flared portion 26 to provide a cam surface to facilitate the application of the clip to the work piece. In addition, the free margin 28 of the leg member 20 extends slightly beyond the cam portion 26 so that the margin 28 may be applied over one side of the work piece and then, upon movement of the clip toward its finally assembled position on the work piece, the edge of the work piece engages the cam portion 26 to force the legs apart.

The fastener member 16 is preferably a screw having a head 29 and a threaded shank 30. The legs 18 and 20 are provided with aligned openings for receiving the shank of the screw. As shown in dotted lines in Fig. 2, the leg member 18 is provided with an opening 32 which is star-shaped or serrated. The shank of the screw is provided with a plurality of radially extending protuberances or splines 34 which extend into the notches formed by the star-shaped or serrated margin of the opening 32 for interengagement with the notches to prevent relative rotation between the clip member and the screw. In addition, the protuberances or splines 34 are deformed to provide abutments 36 which engage the inner surface of the leg 18 so that the leg is clamped between said abutments and the head 29 of the screw to prevent axial displacement of the screw relative to the clip member.

In the embodiment shown in Figs. 1 through 4, the above mentioned opening in the leg 20 for receiving the shank of the screw is provided by an elongated slot 38. It should be noted that the slot is provided with an enlarged portion 40 surrounding the screw to provide clearance for a tool, not shown, for upsetting or deforming the ends of the splines to form the abutments 36. It has been found that by varying the size and shape of the opening 38 in the leg 20 the stiffness of the leg 20 may be varied to adjust the holding power of the clip for various uses.

In order to increase the strength of the sheet material leg 18 to prevent the head 29 from deforming the leg when a complementary fastener member such as a nut is tightened down on the screw shank, an offset or embossed portion 42 is formed in the leg 18 surrounding the aperture 32. In addition, it should be noted that the offset portion 42 is formed projecting away from the leg 20 sufficiently to provide a recess 44 for receiving the abutment means 36. As shown best in Fig. 4, the parts are so proportioned that the abutments 36 are disposed outwardly from the plane of the inner surface of the leg 18 so that when the clip is applied to a work piece there is no interference between the work piece and the abutments 36.

Referring more specifically to Figs. 5 and 6, it is seen that the fastener unit 12a shown therein is substantially identical to the above described fastener 12. However, this embodiment illustrates the manner in which the opening 38a may be formed in the leg 20a for varying the rigidity of the leg and hence the holding power of the clip. In addition, in this embodiment the leg 20a is substantially co-extensive with the leg 18a but slightly shorter so that the free marginal edge 28a is short of the outer edge of the cam portion 26a. The clip of this embodiment may be applied to the work piece in substantially the same manner as the embodiment described above except that the outwardly formed cam portion 26a is applied first to the work piece.

Figs. 7 and 8 illustrate a fastener unit 12b which embodies another modified form of this invention. In this embodiment the aperture 38b in the leg 20b is in the form of a slot extending generally parallel to the connecting bight portion 22b. In addition, it is noted that the width of the leg 20b may be adjusted by cutting along the line 46 to adjust the holding power of the clip. It should be noted that in this embodiment the outer marginal edge 28b of the leg 20b extends, as at 48, completely across the diameter of the screw member to facilitate application of the clip to a work piece. The holding power of the clip may further be adjusted by deforming a protuberance 50 for reducing the area of contact between the leg 20b and a work piece.

The fastener unit 12c shown in Figs. 9 and 10 is substantially identical to the fastener unit 12 except that the legs 18c and 20c are curved to adapt the unit for application to a curved work piece. In addition, in this embodiment the opening 38c in the leg 20c is in the form of an enlarged circle surrounding the shank of the screw with a slot extending radially from the circle and normal to the bight portion 22c.

From the above description it is seen that the present invention provides a novel fastening unit, including a generally U-shaped clip member and a threaded screw, which fastening unit may be simply and economically manufactured and easily applied to a work piece. In addition, it is seen that the holding power of the clip member may be readily adjusted to fill various requirements. In this connection it should be noted that the bight portion connecting the opposed legs of the U-shaped clip is always at least as wide as the work piece so that the opposed legs resiliently grasp the work piece. In addition, it is seen that the present invention has provided a novel fastening unit wherein the clip member is formed to provide increased strength and at the same time to position the abutment means holding the screw from axial displacement so that said abutment means will not interfere with the application of the clip member to a work piece.

While the preferred embodiments of this invention have been shown and described herein, it is obvious that many changes may be made in structural details without departing from the spirit and scope of the appended claims.

I claim:

1. A preassembled fastening unit for application to a workpiece having a marginal opening therein comprising a clip made of sheet material and having opposed leg members disposed to provide a generally U-shaped cross section, one of said leg members having a boss portion offset from said leg member in a direction away from the other of said leg members, said offset portion having an opening therethrough, said opening having a serrated margin, the other of said leg members having an opening aligned with said first mentioned opening, a screw member having a head larger than the opening through said offset portion and disposed in overlying contact with the outer surface of the said offset portion and having a threaded shank disposed through said aligned openings and extending beyond the plane of the second leg member to present a threaded shank adapted to accept a nut or the like, the opening in the said other leg member being smaller than said offset boss portion but larger than the diameter of the screw shank, means on the shank of said screw member in the vicinity of the head for interengagement with the serrated margin of said first mentioned opening and for underlying the under surface of said offset portion to prevent relative rotation and axial displacement between the said clip and said screw member, said means being housed totally within the cavity defined by the walls of the serrated opening and the extension of the boss portion from the plane of its leg member, the lower leg member traversed by the threaded shank being shaped to conform with the surface of the workpiece against which it is mounted.

2. A preassembled fastening unit of the type defined in claim 1, in combination with a panel having a recess extending inwardly from the margin of the workpiece on which the fastener is to be mounted and a second recess communicating with and angularly disposed relative to the first mentioned recess, said second recess being disposed inwardly from the margin of the workpiece a distance not greater than the distance of the threaded stud from the bight which joins the two leg members of the generally U-shaped clip, whereby the angular disposition of the second recess prevents inadvertent movement of the fastener unit when the screw shank of the unit is mounted therein.

References Cited in the file of this patent

UNITED STATES PATENTS

| | | |
|---|---|---|
| 2,236,850 | Hansman | Apr. 1, 1941 |
| 2,278,790 | Langmaid | Apr. 7, 1942 |
| 2,346,200 | Tinnerman | Apr. 11, 1944 |
| 2,401,824 | Gladden | June 11, 1946 |
| 2,620,008 | Mallard | Dec. 2, 1952 |
| 2,654,411 | Bedford | Oct. 6, 1953 |
| 2,683,577 | Flora | July 13, 1954 |

FOREIGN PATENTS

| | | |
|---|---|---|
| 459,349 | Great Britain | Jan. 6, 1937 |
| 988,261 | France | Apr. 25, 1951 |